Oct. 31, 1967  A. SCHNEITER  3,349,640

MEANS FOR BALANCING A ROTARY OR OSCILLATORY FLY-WHEEL

Filed May 25, 1966

INVENTOR.

Ali SCHNEITER

United States Patent Office 3,349,640
Patented Oct. 31, 1967

3,349,640
MEANS FOR BALANCING A ROTARY OR OSCILLATORY FLY-WHEEL
Ali Schneiter, Neuchatel, Switzerland, assignor to Ebauches S.A., Neuchatel, Switzerland, a firm of Switzerland
Filed May 25, 1966, Ser. No. 552,837
Claims priority, application Switzerland, June 21, 1965, 8,649/65
3 Claims. (Cl. 74—573)

The present invention relates to means for balancing a rotary or oscillatory fly-wheel.

The balancing of rotary or oscillatory fly-wheels, particularly horological balance-wheels, is sometimes carried out by the use of weights mounted, on the wheel to be balanced, in such a manner as to be capable of radial displacement. Since it is rarely possible to effect exact coincidence between the diameter, upon which is situated the centre of gravity of the unbalanced wheel, and one of the radii upon which is movably mounted one or more of the weights, in almost all cases the adjustment has to be carried out by moving several weights, which entails time consuming trial-and-error operations before balancing is achieved.

An object of the present invention is to eliminate this drawback by providing balancing means comprising only one balancing member, movable in all radial directions with respect to the wheel to be balanced, thus giving an arrangement which enables said member to be displaced in any direction necessary to effect balancing, whatever the position of the centre of gravity relative to the axis of rotation.

The balancing means according to the invention comprises an annular balancing member, the axis of which is parallel with the axis of the wheel to be balanced, and means for enabling said balancing member to be screwed in an eccentric position along any radial direction with respect to the axis of rotation of said wheel, whereby moving said balancing member off-centre along a radius opposite to the radius passing through the centre of gravity of the wheel, the unbalance in the latter is corrected, and the balance required is thus effected.

The accompanying drawing shows by way of example, two embodiments of the object of the invention.

Figure 1:
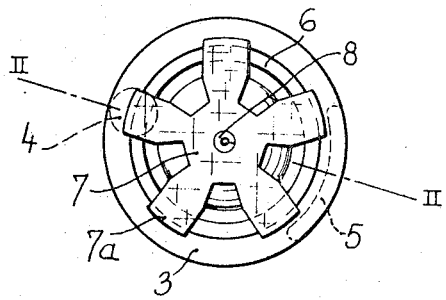
FIG. 1 is a plan view of a component balance wheel of an electrical horological system.
Figure 2:
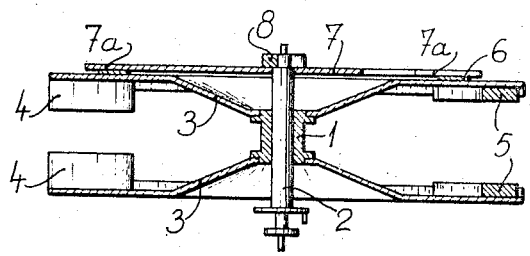
FIG. 2 is a section along the line II—II of FIG. 1 on a larger scale.

The balance wheel shown in FIGS. 1 and 2 comprises a hub 1 drifted on to a spindle 2 upon which are fixed two platforms 3 each carrying a permanent magnet 4 (associated with the electrical operation of the timepiece incorporating the balance) and a counter-weight 5.

The balancing means comprises an annular balancing member 6, located on one of the platforms 3, and pressed resiliently against the latter by a disc 7 fixed to the spindle 2 by a split washer 8, said disc having arms 7a pressing resiliently on to the balancing ring 6.

With this arrangement, the ring 6 can be displaced in any radial direction with respect to the axis of the balanced wheel. To achieve the balancing, the ring 6 is moved off-centre by an amount governed by the extent of the unbalance and along a diameter passing through the centre of gravity of the balance wheel, but opposed to the latter with respect to the axis of rotation.

The mounting of the balancing ring on the wheel to be balanced may be different. Thus, in the case of a conventional horological balance wheel, for example having an arcuate edge and a diametrical arm, as well as in the case of all wheels having cut-away portions, a balancing ring will be placed within the circle of the arcuate edge of the balance wheel or of the rim of the wheel, resilient holding members, fixed to the arcuate edge or rim or to the arm of the balance wheel or to the spokes of the fly-wheel, being used to maintain the balancing ring in the desired eccentric position with respect to the axis of rotation.

Figure 3:
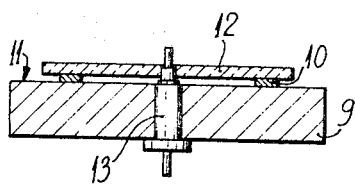
FIG. 3 and 4 are sections through the axis of a fly-wheel showing a second embodiment of the object of the invention.
Figure 4:
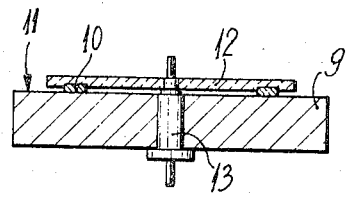

In the embodiment shown in FIGS. 3 and 4, a fly-wheel designated by the numeral 9 carries a balancing ring 10; the latter is gripped between an axial face 11 of the fly-wheel 9 and a disc 12 of plastics material fixed on the shaft of the fly-wheel, which shaft is designated by the numeral 13.

When the balancing has been carried out, axial pressure is applied upon the disc 12 during heating thereof in such a way that the balancing ring 10 embeds itself to some extent in the material of the disc, thus preventing any relative displacement between said ring and the fly-wheel (FIG. 4).

In a variant, the balancing ring is held in position by means, resilient or otherwise, which would not be intended to fix it permanently, this fixing being achieved, once balancing has been completed, for example by gluing the ring on the fly-wheel.

What I claim is:

1. In means for balancing a rotary or oscillatory fly-wheel, an annular balancing member, the axis of which is parallel with the axis of said fly-wheel, and means enabling the said balancing member to be secured to the said rotary wheel in an eccentric position along any radial direction with respect to the centre of rotation of said wheel, whereby, by moving said balancing member along a radius opposite the radius passing through the centre of gravity of the wheel, the unbalance of the latter is corrected.

2. In balancing means as claimed in claim 1, resilient means pressing the said annular balancing member on one of the axial faces of said fly-wheel.

3. In balancing means as claimed in claim 1, a disc which is fixed by its centre to said fly-wheel and which has resilient radial arms bearing on said annular balancing member for pressing it on one of the axial faces of the said fly-wheel.

No references cited.

FRED C. MATTERN, Jr., *Primary Examiner.*

F. D. SHOEMAKER, *Assistant Examiner.*